Aug. 27, 1957     C. L. POBANZ     2,804,311
HYDRAULIC ANTI-ROLL STABILIZER SYSTEM
Filed March 5, 1954     2 Sheets-Sheet 1
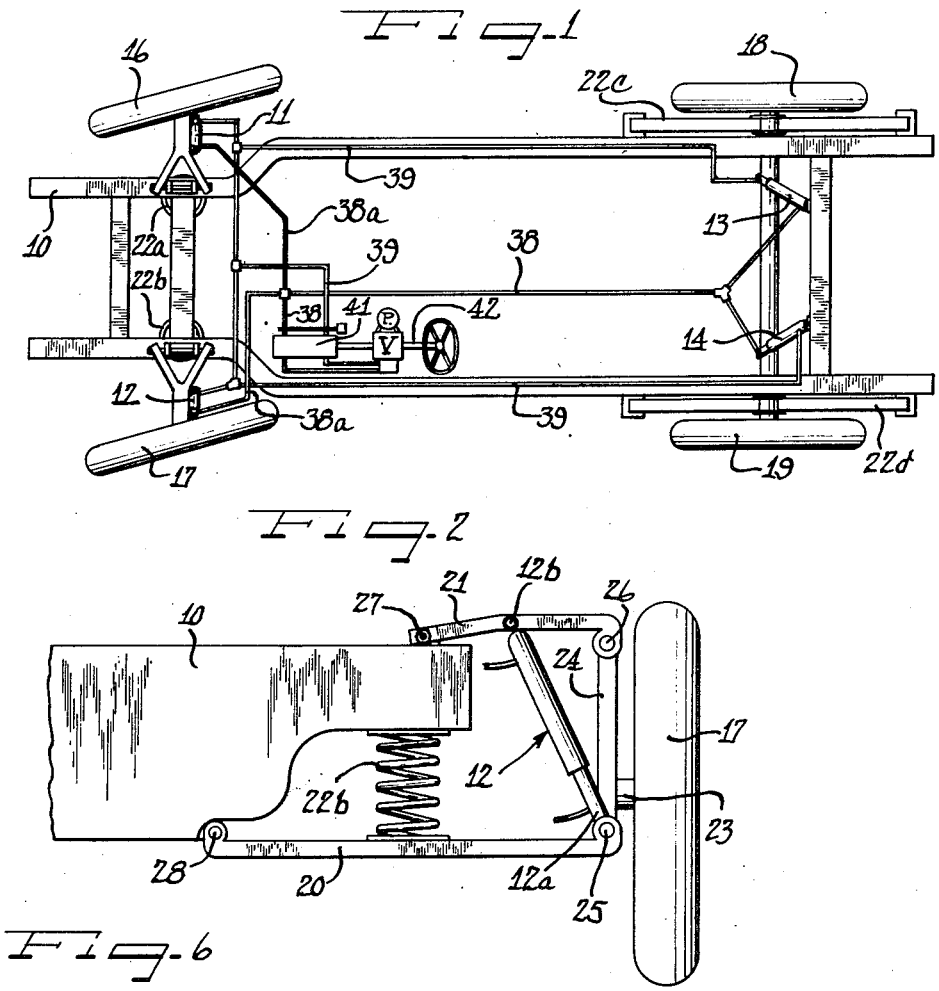
Inventor
Clifford L. Pobanz

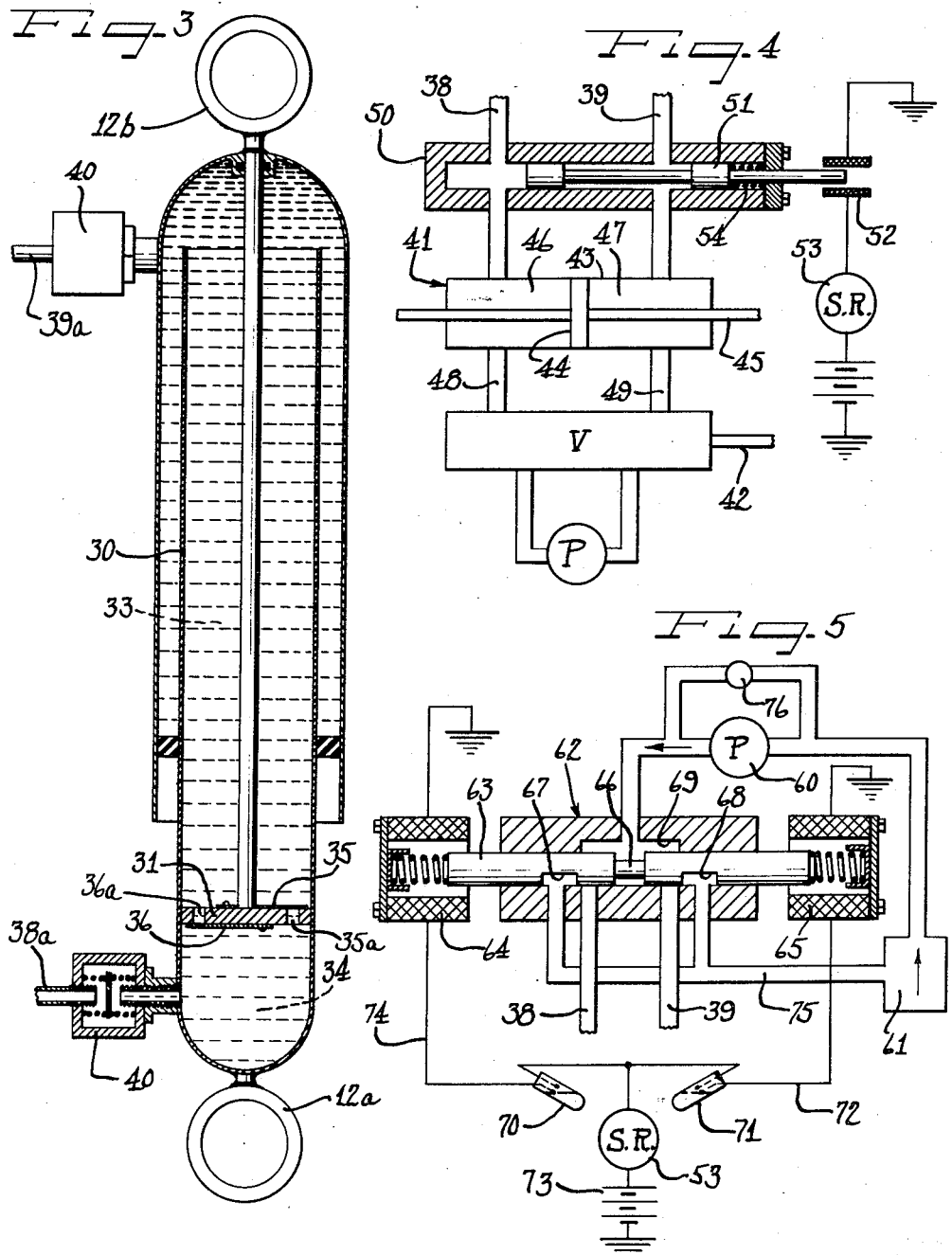

United States Patent Office 2,804,311
Patented Aug. 27, 1957

2,804,311
HYDRAULIC ANTI-ROLL STABILIZER SYSTEM

Clifford L. Pobanz, Galva, Ill.

Application March 5, 1954, Serial No. 414,460

2 Claims. (Cl. 280—112)

The present invention relates to stabilizer systems for vehicles and, more particularly, relates to a novel control system for the prevention of vehicle body roll while traversing turns.

In recent years it has become common knowledge in the automotive art that the modern high speed vehicle has far outdistanced road development. The trend in the automotive industry has been toward greater and greater horsepower, and hence higher automotive cruising speeds. Although numerous super highways have been built to accommodate such modern high speed vehicles, nevertheless the bulk of the roads available today in the United States is not adapted to highspeed travel. Thus, the development of the automotive vehicles is such that the major limitation on automotive performance lies not in the power of the vehicle itself, but rather, in the limitations imposed upon high speed travel by the twisting, turning roads now found in most communities.

At present therefore, it is absolutely necessary to approach sharp curves at a slow speed. This is due to the fact that present automotive suspensions systems are insufficiently stiff, or otherwise controlled, to prevent the car from rolling toward the outside of the turn. Thus, as the modern automobile enters a sharp turn, its centrifugal force and momentum tend to force the automobile to continue moving in a straight line. This force tends to place a large part of the vehicle's weight on its outside front and rear wheels, i. e., the wheels on the side of the vehicle remote from the direction of turn, and in the absence of adequate control systems for this movement, an automotive vehicle entering a sharp turn at high speeds may well turn completely over in attempting to traverse the curve.

In order to prevent automotive turnovers as a result of dipping of the outside of the car during a fast turn, which dipping tends to permit the lifting of the inside of the car and hence the center of gravity of the car, the present invention has provided a control system whereby dip, or a lowering of the automotive body, at the outside portion thereof relative to the direction of curve in the turn, is actually prevented or substantially reduced. Through this expedient, great stability is provided for the automotive vehicle and vehicles equipped with the apparatus of the present invention are capable of traversing sharp turns at much higher speeds than conventional vehicles.

The present invention generally comprises a hydraulic system associated with shock absorbers similar to those now in service in conventional automobiles. Through the selective application of fluid pressure to the shock absorbers at each of the automobile wheels, the present invention applies a force at the outside of the vehicle body, during the traversing of a turn, tending to expand the shock absorbers and thereby urge the outside of the automotive vehicle body upwardly away from the road. Simultaneously with the upward movement of the automotive body at the outer side thereof, the inner side of the body is lowered and the suspension springs on the inner side of the vehicle are compressed and confined during completion of the turn.

The apparatus of the present invention provides automatic control for the operation of the shock absorbers as above outlined. This automatic control is sensitive to turning movement of the vehicle and responds to such turning action to counteract the roll or dipping toward the outside of the turn ordinarily associated with a turn. Further, a control is provided whereby the stabilizer is rendered inoperative during low speeds at which no appreciable roll occurs.

It is, therefore, an object of the present invention to provide an anti-roll stabilizer system for automotive vehicles.

A further object of the present invention is to provide a novel anti-roll stabilizer system automatically operable to maintain the vehicle substantially level while traversing turns.

Yet a further object of the present invention is to provide a novel vehicle suspension control apparatus whereby the outer side of a vehicle performing a turn is urged upwardly away from the road while the inner or near side of the vehicle is prevented from lifting away from the road.

Still a further object of the present invention is to provide a novel suspension control system associated with the power steering apparatus of a modern automotive vehicle whereby power provided for the function of steering the vehicle may simultaneously be utilized to maintain the vehicle in a stable condition while traversing sharp curves.

A feature of the present invention is a shock absorbing system comprising four individual shock absorbers, each controlling a separate vehicle wheel, and each hydraulically connected to the others.

A further feature of the present invention is the provision of a speed responsive control valve actuatable upon a decrease in automotive speed below a predetermined set value render the stabilizer system inoperative.

Still another feature of the present invention is an extensible and contractible power cylinder associated with each of the vehicle wheels, and which is automatically extended upon the presence of external forces tending to contract it and is automatically contracted upon the presence of external forces tending to expand it, thereby operating to minimize the effect of said forces with vehicle body.

Still further objects and features of the present invention will at once become apparent to those skilled in the art from a consideration of the attached drawings in which several embodiments of the present invention are shown by way of illustration only, and wherein:

Figure 1 is a plan view, of diagrammatic nature, illustrating the relationship of the component parts of the present invention relative to conventional vehicle components.

Figure 2 is an enlarged detail view shown in schematic form of the left front wheel suspension of a vehicle utilizing the apparatus of the present invention;

Figure 3 is an enlarged diagrammatic view of an individual stabilizing cylinder instructed according to the present invention;

Figure 4 is an enlarged, diagrammatic view illustrating the control system for the stabilizing apparatus as pictured in Figure 1;

Figure 5 is a modified form of control system utilizable in the present invention: and Figure 6 is a further modified form of the control system shown in Figure 5.

As shown on the drawings:

The hydraulic stabilizing system of the present invention may be utilized with substantially all automotive vehicles or other similar vehicles found in today's market. While various types of vehicles utilize somewhat different arrangements of running gear parts, nevertheless most of the present day vehicles, if not all of them, provide a suspension system built around the same basic principles. Thus, in the systems of which I am aware, the vehicle is provided with springs between the body of the vehicle and each wheel thereof such that each wheel is permitted to move relative to the body to absorb road shocks. This is true whether the suspension of each individual wheel is independent of or dependent on one or more of the remaining wheels.

As is well understood in the art, springs of sufficient elasticity to permit a smooth and comfortable ride over irregular road surfaces are too flexible to provide a sufficient control between the automotive body and the individual wheels. Thus, without external controls, the conventional springs would continue to flex long after the source of flexing force were past. In order to dampen spring oscillations and to prevent the car from continued bouncing of the wheels after the rough spot on the road has been passed, shock absorbers, in the form of dashpots, are universally used. In present vehicular installations, such dashpots are provided at each of the wheels of the vehicle and are linked to the running gear in a manner to effectively tie the individual wheels to the automotive body through a body of damping fluid.

In view of the general similarity between systems relative to the positioning and functioning of the individual shock absorbers, they are shown only diagrammatically in Figure 1 of the drawings. There, shock absorbers 11, 12, 13 and 14 modified as described below are shown at the four corners of the vehicle frame 10. Although, as above discussed, arrangements may differ, it is intended that the shock absorbers 11, 12, 13 and 14 be positioned in a substantially, although not completely, vertical position with the lower ends 11a, 12a, 13a and 14a secured for movement with the respective vehicular wheels 16, 17, 18 and 19. The opposite ends 11b, 12b, 13b and 14b are secured for movement substantially with the vehicle frame. Vehicle support springs 22a, 22b, 22c and 22d are positioned between the frame 10 and the respective wheels 16, 17, 18 and 19.

A detail view of the lower lefthand wheel as viewed in Figure 1, or the front left wheel of the vehicle, may be found in Figure 2 wherein one form of conventional front steering linkage is found. There, the shock absorber 12 is connected between the lower control arm 20 and the upper control arm 21 and acts to dampen the vehicle spring 22b relative to the vehicle frame 10. The wheel 17 is rotatably mounted on the wheel spindle 23 which in turn is mounted for pivotal movement about a vertical axis associated with the spindle support 24. The spindle support 24 is secured at 25 and 26 to control arms 20 and 21, respectively, at which points the support 24 pivots about longitudinally extending horizontal pivot axes.

Due to the fact that the end 12b of the shock absorber 12 is connected to a point on the control arm 21 closer to the pivot 27 thereof with the frame 10 than the end 12a is connected to the pivot 28, vertical movements of the spindle 23 will cause a contraction of the shock absorber and downward movement thereof will cause an expansion.

The above description is illustrative of only one conventional arrangement, and it is to be understood that the present hydraulic control system may be utilized equally well with steering systems in which the shock absorber 12 is connected between the point 25 and a point rigidly secured to the frame 10. The only requirement is that expansion and contraction of the shock absorber be reflected in a vertical movement of the frame 10 relative to the wheel spindle 23.

As may be seen from a consideration of Figure 3, the shock absorber 12 comprises a cylinder 30 connected with the end 12a and a piston 31 rigidly connected to the end 12b. Hydraulic fluid is provided in the respective spaces 33 and 34 and is permitted to pass through the piston 31 in a restricted manner. While various means are conventionally provided for restricting the flow between the chambers 33 and 34, for purposes of illustration, a normally closed spring flap valve 35 is provided to control the flow from chamber 33 to chamber 34 through the piston 31 on a slow compression or contraction stroke while a normally closed spring flap valve 36 controls the flow for a slow extension stroke. Fast movements of the piston 31 are controlled by the orifices 35a, 36a under the springs 35, 36 respectively. These orifices restrict flow to an increasing extent as the velocity of flow therethrough increases.

It will be understood that the showing in Figure 3 is diagrammatic and substantially any conventional shock absorber structure may be employed to provide the necessary restricted flow through or around the piston 31. In this connection it is noted that as in conventional systems, fluid flow between the chambers 33 and 34 occurs without substantial restriction during gradual contraction or expansion but with increasing restriction as the acceleration of contraction or expansion increases. No expansion chamber is shown for the chamber 34 to compensate for volume of the piston rod, but such compensation may of course, be provided in the shock absorber such as, for example, by a resilient reservoir in the piston rod.

As so far described, the suspension system is considered conventional. As explained above, although this suspension system has been utilized substantially universally, nevertheless it is deficient in the control of the body of the automotive vehicle during high speed or extremely sharp turns. With a suspension system as above outlined, when the automotive vehicle enters a sharp turn at high speeds, the weight of the vehicle tends to contract the shock absorber 11, assuming a lefthand turn with the wheels positioned as shown in Figure 1. This contraction permits the body 10 of the vehicle to swing toward the wheels 16 and 18 greatly reducing the weight on the wheels 17 and 19. This reduction in weight permits the vehicle springs 22b, 22d associated with the wheels 17 and 19 to urge the body 10 upwardly away from the road, thereby tending to shift the center of gravity of the automotive vehicle and in some instances cause it to overturn. Of course, in the removal of the weight from the wheels 17 and 19, the shock absorbers 12 and 14 become extended.

The object of the present invention is to redistribute the fluid in the separate shock absorbers so as to prevent the above-described contraction of the shock absorbers upon which the major portion of the vehicle weight is placed during turns. By thus preventing contraction, and also by preventing expansion of the unloaded shock absorbers during turns, the automotive vehicle body may be retained in a substantial level condition. In this condition, the center of gravity of the vehicle is maintained at its normally low position and the danger of a roll-over or unstable turn is minimized to the greatest possible extent.

For this purpose, the upper chambers 33 of the righthand shock absorbers 11 and 13 are hydraulically connected to the lower chambers, correspondingly to the chamber 34, of the lefthand shock absorbers 12 and 14. Likewise, the upper chambers corresponding to the chamber 33 of shock absorbers 12 and 14 are connected to the lower chambers, corresponding to the chamber 34, of the shock absorbers 11 and 13. The conduits 38 and 39, respectively, leading to the upper chamber of the right and lefthand shock absorbers are connected to sources of fluid pressure controlled in response to the direction of turn.

Thus, as the vehicle makes a left turn and there is an attempted contraction of the shock absorbers 11 and 13, fluid under pressure is supplied to the conduit 39 tending to expand the shock absorbers 11 and 13, and, likewise, the conduit 38 is relieved of pressure thereby permitting expansion of the shock absorbers 11 and 13. Simultaneously with the expansion of shock absorbers 11 and 13, the opposite or left hand shock absorbers 12 and 14 are contracted by the fluid pressure introduced into the chambers 33 thereof by conduit 39. Thus, the pressure in the conduit 39 will tend to lift the normally depressed portions of the frame 10 and depress the normally lifted portions thereof. In view of this pressure distribution, it becomes impossible for the unloaded side of the vehicle body 10 to lift off the road and roll over.

The connections utilized in the apparatus diagrammatically shown in the drawings, may be seen from a consideration of Figure 3. There, conduit 38 is connected through flexible conduit 38a to chamber 34, while conduit 39 is connected through conduit 39a to chamber 33. Each of the conduits 38a and 39a is provided with a flow control valve 40. The valve 40 permits substantially free flow from the conduits 38a or 39a into the respective chamber 34 or 33 but prevents sudden surges due to road shocks and similar disturbances from causing an undesirable flow from the chambers 33 or 34 of the shock absorber to the conduits. The check valves 40 provide an effective limiting action which permits the application of contracting or expanding pressures to the shock absorbers from conduits 38a or 39a without simultaneously permitting a surge of hydraulic fluid back and forth between shock absorbers as a result of instantaneous shock impacts applied to the steering linkage. In order to permit the proper control of the piston 31, the valves 40 have a restricing effect, during flow from the shock absorber through either valve 40, that is slightly less than that of the associated restricting spring valve 35 or 36. This relationship prevents a hydraulic block when fluid is introduced on one side of piston 31, by conduits 38 or 39 since leakage through valve 35 or 36 will be less than the leakage permitted through the respective valve 40. However, the valve 40 will close under pressure in for example, chamber 34 before the restrictive effect of the orifice 35a is felt and hence in operation under shock, the individual shock absorbers will be effectively isolated.

An advantage found in utilizing the arrangement shown in Figure 3 for the installation of the valve 40 is that installation may be made, if desired, directly to the shock absorbers through the mere expedient of tapping into the chambers 33 and 34 through the outer cylindrical wall thereof. Thus, many conventional installations now in use may be readily modified to utilize the hydraulic control system of the present invention.

In the use of shock absorber units having the valves 40 integrated into the original unit, provision should be made for a semi-permanent plug to block off the exit passageways from the valves 40. Such an arrangement would thus provide a shock absorber capable of use as an ordinary single unit or, alternatively, as a part of the present system. Thus, the complete system could be sold as optional equipment and the only work necessary to change the shock absorbers over would be to unplug the exits to valves 40 and connect conduits 38 and 39 thereto.

As above stated, the conduits 38 and 39 are pressurized in response to right and left turns respectively. This pressurization may be accomplished through several methods, two preferred embodiments of which are illustrated in the present drawings. In Figures 1 and 4, a first form is illustrated. There, the power source utilized with the now well known power steering systems is utilized for performing the dual function of power steering and roll stabilization. Thus, the power motor 41 utilized with the steering column 42 for causing actuation of the wheels 16 and 17 to the left or right in response to steering movements at the steering column 42, is hydraulically connected to the conduits 38 and 39. This connection is illustrated in some detail in Figure 4.

There, the power steering motor 41 is shown to comprise an outer cylinder 43 in which a power piston 44 is reciprocably mounted. The piston 44 is rigidly secured to an actuating rod 45 which may be secured in any conventional manner not forming a part of the present invention, to the automotive steering linkage so as to cause a steering movement of the vehicle wheels 16 and 17 into a left turn position, shown in Figure 1, when the rod 45 is moved toward the left as viewed in Figure 4. Likewise, when the rod 45 is moved toward the right, a righthand turn of the vehicle is desired. Movement of the rod 45 is accomplished through the introduction of fluid under pressure into the chambers 46 and 47 by means of conduits 48 and 49 which are connected to a conventional fluid pump P, by way of a conventional power steering control valve V.

Simultaneously with the introduction of fluid under pressure to either the chamber 46 or the chamber 47, fluid pressure is introduced into the respective conduits 38 and 39 through a speed responsive control valve 50. This valve 50 comprises a reciprocable valve core 51 actuated by means of a solenoid 52 into the position shown in Figure 4 upon energization of the solenoid 52 by means of a speed responsive switch 53.

The switch 53 is constructed to energize the solenoid 52 upon the attainment of a predetermined minimum automobile speed, such as, for example, 20 miles per hour, above which it is desirable that the roll stabilizing system of the present invention be operative. Below the above mentioned predetermined speed, the spring 54 will urge the valve core 51 into position in which the conduits 38 and 39 are both blocked off from the power steering motor 41. Thus, at speeds below the predetermined speed, the individual shock absorbers 11, 12, 13 and 14 will operate in a conventional manner. This is true since the operation of the pump is disconnected from the conduits 38 and 39 leading to the hydraulic shock absorbers and hence expansion or contraction of the shock absorbers cannot occur except as a result of ordinary shock absorber action.

Although the above outlined system is satisfactory for use in automotive vehicles having power steering, it is to be understood that the present invention may be utilized with vehicles already in service which do not have power steering equipment. The control system for use in vehicles not equipped with power steering is shown in Figures 5 and 6 in which a separate pump 60, preferably associated with the fan belt of the vehicle motor, is provided for supplying fluid under pressure to the whole stabilizing system.

As may be seen, the pump 60 forces fluid from the reservoir 61 through the valve 62. The valve 62 comprises a valve core 63 reciprocal in response to alternate energization of the solenoids 64 and 65. The core 63 is provided with a central annular groove 66 and bypass notches 67 and 68. The inlet notch or recess 69 is sufficiently long to cover both the conduits 38 and 39. As in the modification shown in Figures 1 and 4, the conduits 38 and 39 lead to the respective shock absorbers.

A pair of mercury switches 70 and 71 are provided for controlling the solenoids 64 and 65, respectively. Thus, upon movement of the vehicle into a left turn, the mercury in the switch 71 will be thrown to the right as viewed in Figure 5 thereby energizing the solenoid 65 through the conduit 72 connected to the battery 73. Likewise, upon movement of the vehicle into a right turn, the mercury in the switch 70 will be thrown to the left as viewed in Figure 5 to energize the solenoid 64 through the conduit 74 also connected to the battery 73 in parallel with the switch 71.

In operation, when the vehicle enters a left turn and the switch 71 is closed, the solenoid 65 will be actuated to move the valve core 63 to the right as viewed in Figure 5. This movement will connect the inlet 69 to the conduit 39 which will cause an expansion of the shock absorber 11 and 13 and a contraction of the shock absorbers 12 and 14, thereby preventing a tendency of the automotive vehicle to move downwardly on the right hand side as it makes the left turn. Likewise, when a righthand turn is made, the switch 70 is closed and the solenoid 64 thus energized. This will cause movement of the valve core 63 to connect the inlet 69 to the conduit 38 which will in turn cause expansion of the shock absorbers 12 and 14 and contraction of the shock absorbers 11 and 13 thereby again preventing a roll over toward the side remote from the direction of turn.

As in the embodiment shown in Figures 1 and 4, a speed responsive switch 53 is provided in the conduit 73 to prevent connection of the pump 60 with the hydraulic shock absorbers except at speeds above a predetermined speed.

It will be noted that upon the application of the pump pressure to either the conduits 38 and 39, the other of the conduits is bypassed to the conduit 75 leading to the reservoir 61. This bypass permits the ready release of the fluid from the chambers 34 of the shock absorbers being contracted, to thus prevent the possibility of binding or hydraulic locking action which would prevent the efficient operation of the system. Likewise, in order to completely eliminate the possibility of damage to the system upon an overload or similar occurrence, a pressure relief valve 76 is provided to bypass the valve 62. This valve permits the bypassing of excessive fluid pressure from the pump 60 back to the reservoir 61, thereby preventing a build-up pressure in the conduit 69 above a predetermined safe value.

In Figure 6, a modified form similar to that shown in Figure 5 is disclosed. There a pendulum 77 is substituted for the switches 70, 71 shown in Figure 5. However, in operation, the pendulum performs substantially the same function as the two mercury switches 70 and 71. Thus, as the automotive vehicle enters the lefthand turn, the pendulum 77 will move to the right as viewed in Figure 6 due to momentum. This movement toward the right will close the switch formed by the pendulum contact 77a and the contact 78 to energize the conductor 72 and hence the solenoid 65. Likewise upon a righthand turn, the pendulum 77 will move to the left abutting the contact 79 and hence energizing the conductor 74 leading to the solenoid 64.

It will be understood that modifications and variations may be made in the structure herein disclosed without departing from the scope of the novel concepts of the present invention.

I claim as my invention:

1. A combined shock absorber and stabilizer system for a vehicle having a frame supported by a plurality of wheels movable vertically relative thereto comprising a dashpot positioned between said frame and each of said wheels, each of said dashpots comprising a housing, a member movable in either direction in said housing against confined fluid, means permitting the gradual passage of fluid from one side of said member to the other through said member, a source of fluid under pressure, a control valve operable selectively to introduce pressurized fluid from said source into said housing on one side of said member or the other, means actuating said control valve in response to the initiation of a turn by said vehicle to introduce fluid under pressure to said housing whereby said member will operate to oppose movement of the body of said vehicle toward the ground on the outside of the turn and to oppose movement of the body of said vehicle away from the ground on the inside of the turn, a conduit interconnecting the top chambers of the dashpots on one side of said vehicle to the bottom chambers of the dashpots on the one side of said vehicle and said control valve, a conduit connecting the top chambers of said dashpots on the other side of said vehicle with the bottom chambers of the dashpots on said one side of said vehicle and the control valve, and a normally open valve positioned in each of said conduits immediately adjacent its connection with said dashpots, said last named valves each operating to close upon the application of a shock induced surge of fluid in either direction of flow whereby said dashpots are hydraulically interconnected except under conditions of shock impacts.

2. A vehicle roll stabilizer and shock absorbing control system for controlling the position of a vehicle body relative to the wheels on the right and left sides thereof comprising, a plurality of hydraulic motors, means connecting one of said motors to said vehicle body and the right front wheel of said vehicle, a second means connecting a second of said motors to said body and to the left front wheel of said vehicle, means automatically actuating said motor connected to said left wheel to urge body upwardly away from said left wheel upon the initiation of a right turn of said vehicle and automatically actuating said motor attached to the right wheel to urge said body upwardly away from said right wheel upon initiation of a left turn of said vehicle, means hydraulically interconnecting said motors to provide simultaneous opposite operation thereof, means permitting gradual changes in the position of said motors and comprising valve means positioned in the piston of each of said motors to permit fluid flow therethrough gradually, and instantaneous isolation valve means in said means interconnecting said motors, said last named means comprising a normally open valve actuatable into a closed position by flow surge resulting from impact shocks being applied to the fluid in the associated motor from the respective wheel, whereby said motors are interconnected hydraulically during conditions of vehicle turn except when shock impacts are applied to individual vehicle wheels during such turn.

References Cited in the file of this patent
UNITED STATES PATENTS

| | | |
|---|---|---|
| 1,282,712 | Barrel | Oct. 22, 1918 |
| 1,588,780 | Stanzel | June 15, 1926 |
| 2,353,503 | Rost | July 11, 1944 |
| 2,684,254 | Goss | July 20, 1954 |
| 2,735,691 | Carlson | Feb. 21, 1956 |